Feb. 7, 1956

W. A. PENNOW 2,734,180

APPROACH LIGHT SYSTEM

Filed Aug. 7, 1947

WITNESSES:

INVENTOR
Willis A. Pennow.
BY
ATTORNEY

Feb. 7, 1956      W. A. PENNOW      2,734,180
APPROACH LIGHT SYSTEM
Filed Aug. 7, 1947      5 Sheets-Sheet 2

WITNESSES:

INVENTOR
Willis A. Pennow.
BY
ATTORNEY

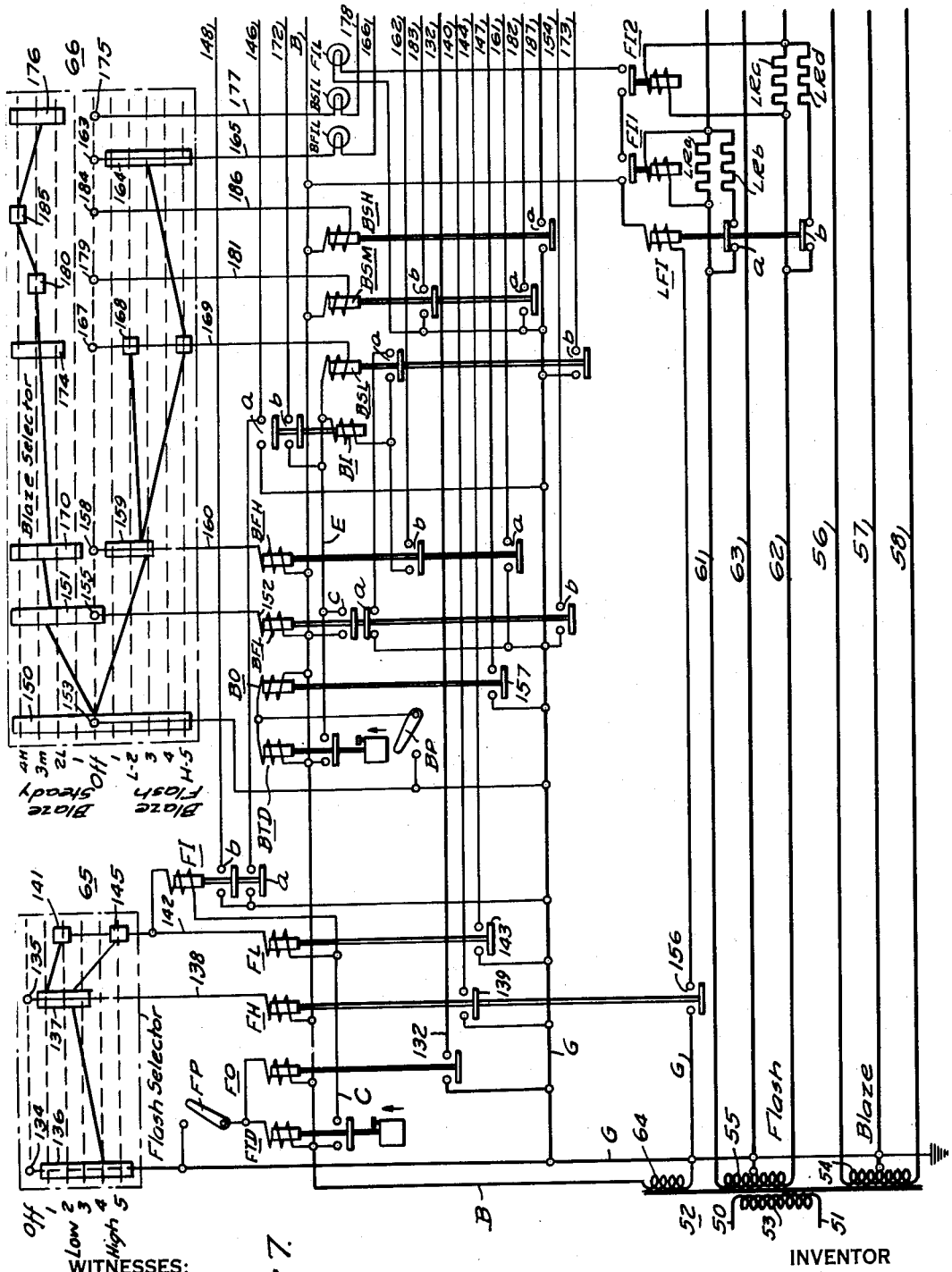

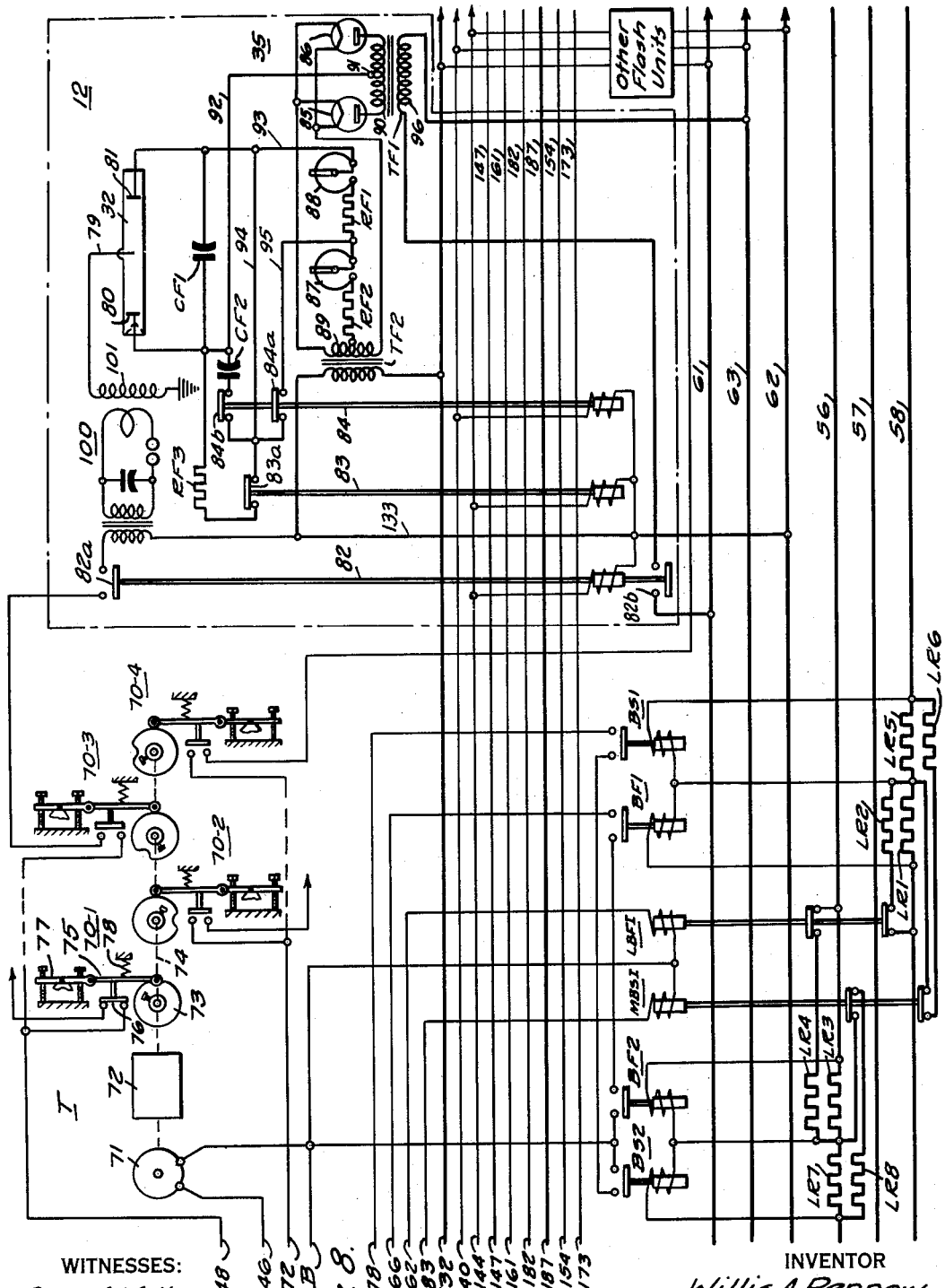

Feb. 7, 1956 W. A. PENNOW 2,734,180
APPROACH LIGHT SYSTEM
Filed Aug. 7, 1947 5 Sheets-Sheet 5
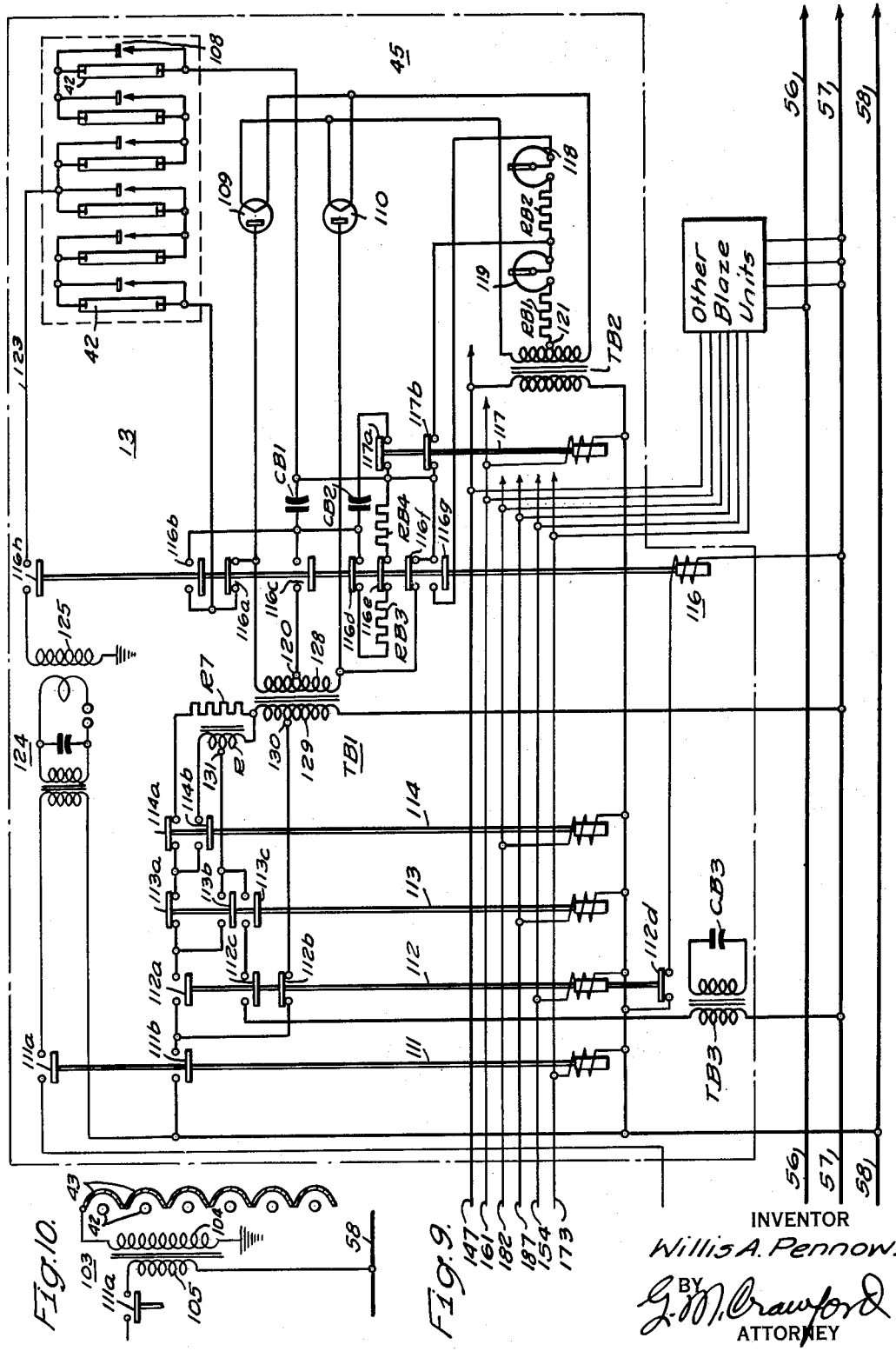
INVENTOR
Willis A. Pennow.
BY
G. M. Crawford
ATTORNEY

United States Patent Office 2,734,180
Patented Feb. 7, 1956

2,734,180
APPROACH LIGHT SYSTEM

Willis A. Pennow, Cleveland, Ohio, assignor to Westinghouse Electric Corporation, East Pittsburgh, Pa., a corporation of Pennsylvania Application August 7, 1947, Serial No. 767,137

20 Claims. (Cl. 340—26)

My invention relates, generally, to a lighting system and apparatus, and, more particularly, to an approach light system and apparatus for airports as an aid to landing aircraft under weather conditions of all kinds, particularly adverse weather conditions.

Heretofore, various attempts have been made to devise landing systems of all kinds by the use of light signals as well as radio signals. Radio signal systems require not only an expensive ground equipment but also instruments on the plane. While such systems are useful and play an important part in the safe landing of aircraft, they are not wholly adequate when used alone. Various light signal systems have been tried out over the past years, but for the most part are not adequate under extremely bad weather conditions as it is imperative for the pilot to know where he is at all times, both with respect to his elevation and line of approach to the landing end of a runway.

Accordingly, it is an object of my invention, generally stated, to provide an approach light system of such nature that a visual landing operation can be easily and safely made under all weather conditions during the day or at night, and which shall be reliable in operation and not require the use of additional instruments of any kind on the plane.

A more specific object of my invention is to provide a system of a character described which may be used in conjunction with any type of instrument approach system for the purpose of making it possible for the pilot to effect a visual landing operation after the plane has reached a predetermined zone in the approach path located at a considerable distance from the end of the runway by instrument approach control.

Another object of my invention is to provide an approach light system which may be selectively controlled to produce various kinds of individual light signals, or combinations thereof, depending upon the weather conditions, both in advance of the landing end of the runway and alongside of the runway ranging from a soft colored glow of light to a simulated flash of lightning.

A further object of my invention is to provide, in a system of this kind, for producing the light signals by means of light units of several types, some of which are disposed along the side of the runway, others at the end of the runway, and still others in alignment in the approach zone to the runway, all of which may be selectively controlled to produce the necessary lighting signal or signals most suitable for the particular weather condition at the time of landing.

A still further object of my invention is to provide for controlling the operation of a line of spaced apart light units so as to produce a simulated lightning flash travelling in a predetermined direction.

Another object of my invention is to provide for positively controlling the operation of a line of spaced light units of the high intensity flashing type so as to effect a timed operation of the light units in sequence from one end of the line to the other.

Another object of my invention is to provide a method of landing aircraft under any and all weather conditions from zero visibility to full visibility by the use of light signals of various kinds produced alongside and in advance of the landing end of the runway.

Another object of my invention is to provide for effecting a visual landing of aircraft by means of a simulated flash of lightning travelling toward the landing end of the runway from a predetermined area or zone in the approach path.

Another object is to provide a method of landing aircraft whereby the pilot of an incoming plane which has been guided to the airport by instrument approach is guided to a visual landing on a desired runway by selectively controlled light signals visible under all weather conditions.

These and other objects of my invention will become more apparent from the following detailed description of a preferred embodiment thereof, when read in conjunction with the accompanying drawings, in which.

Figure 3:
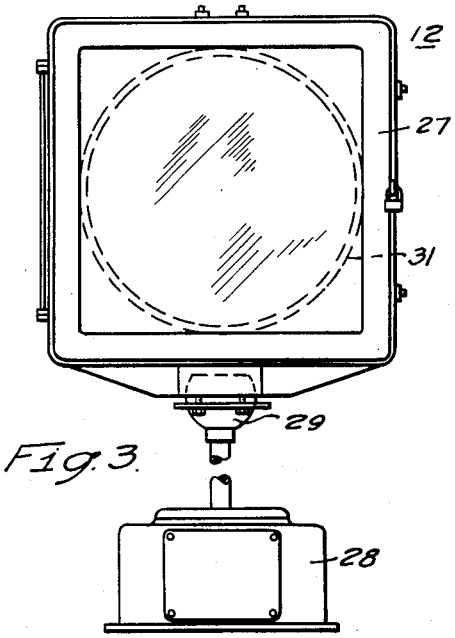
Fig. 3 is a front elevational view of one of the light units utilized in my approach light system.
Figure 5:
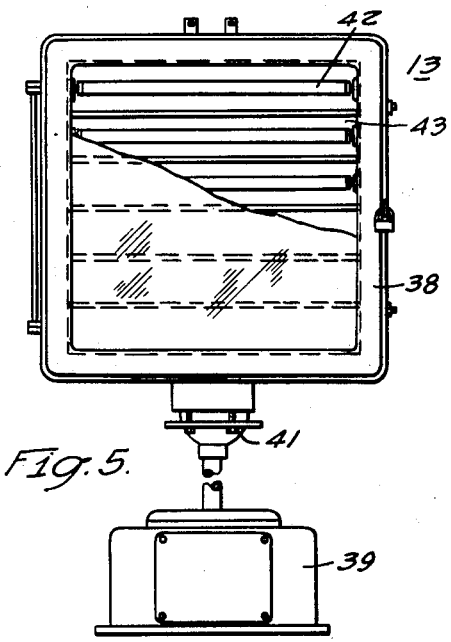
Fig. 5 is a front elevational view, partly broken away to show details, of a light unit of a different type utilized in my approach light system.

Figs. 7, 8 and 9 collectively show, in diagrammatic form, the electrical control for the light units of Figs. 3 and 5, as well as some of the details of the electrical apparatus associated with these light units; and Fig. 10 is a diagrammatic view of a modification of a portion of the apparatus shown in Fig. 9.

In practicing my invention in what I now believe to be the preferred form, there is provided a line of spaced apart light units extending from the landing end of the runway along and parallel to the extended center line thereof for a distance of about 3,000 feet. These light units are of two different types which may be referred to as blaze and flash units, although the blaze units are also operated at times as flash units. These units are alternately disposed along the line and 36 of each type are used in this particular example, although it is contemplated that a smaller or larger number may be used to suit different conditions. The 16 units next to the landing end of the runway are spaced about 75 feet apart, the next 20 units are about 50 feet apart, and the remaining 36 units are about 25 feet apart. All units are aimed at a point about 6,000 feet from the runway threshold, i. e., the landing end, at about 1,000 feet elevation.

The blaze units are of the neon type, each employing a plurality of, 6 in this instance, red neon tubular lamps which may be operated as steady burning units of variable candle power or as flashing units also of variable candle power. The flash units each utilize one high-intensity discharge lamp, known as a krypton lamp, and are operated only as flashing units of varying intensity.

This line of light units is selectively controlled from a ground station or control tower so as to produce light signals of various kinds dependent upon weather conditions at the time of landing. The line of light may vary all the way from that produced by the blaze units alone operating as steady burning units at low intensity under conditions of maximum visibility to that produced by both the blaze and flash units operating as flashing units at high or maximum intensity under conditions of minimum or zero zero visibility.

In this example, the line is flashed at the rate of 40 times per minute. All the units being flashed at the particular time are flashed in predetermined timed sequence under the direct control of a timer or synchronizer so as to produce a simulated flash of lightning travelling toward the landing end of the runway. The beam spread of each light unit encompasses the normal approach portal which is 400 feet high and 700 feet wide with its lower edge 100 feet above the level of the runway surface.

In addition to this line of lights, there is also used in conjunction therewith runway designators, angle of approach indicators and high intensity threshold and runway lights. The runway designators are an assembly of luminous tubes forming either a large green arrow to indicate that the runway is clear, or a large flashing red cross to indicate that it is closed. These designators are of known construction and the details thereof do not, per se, form a part of my invention. The high intensity threshold and runway lights are positioned across the end of the runway and along the sides thereof. That is, a line of spaced green runway lights extends across the end of the runway with an 80-foot gap in the center and the runway is outlined by additional white runway lights spaced 200 feet apart along each side or edge thereof. The angle of approach indicator lights are mounted in pairs, one on each side of the runway about 600 feet back of the threshold.

While specific numbers of light units, spacing distances, flashes per minute, etc., have been given in this example, it is to be understood that these values may be different and varied to suit various conditions encountered in the actual use of the system.

GENERAL ARRANGEMENT AND NATURE OF LIGHT UNITS

Figure 1:
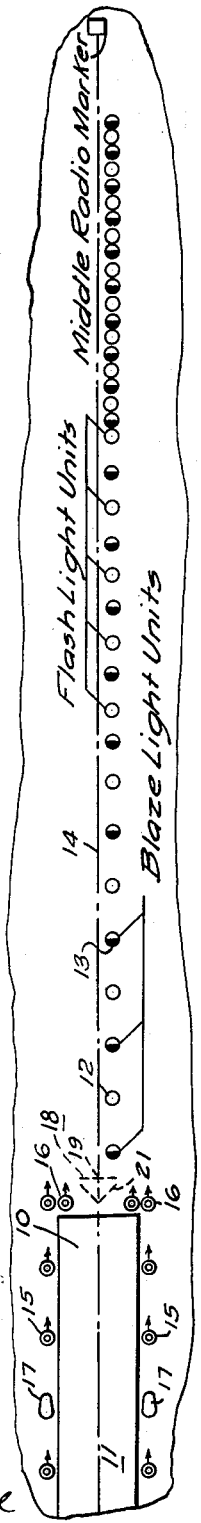
Figure 1 is a diagrammatic plan view showing the end of the runway and the light units associated therewith constituting the elements of my invention.
Figure 2:
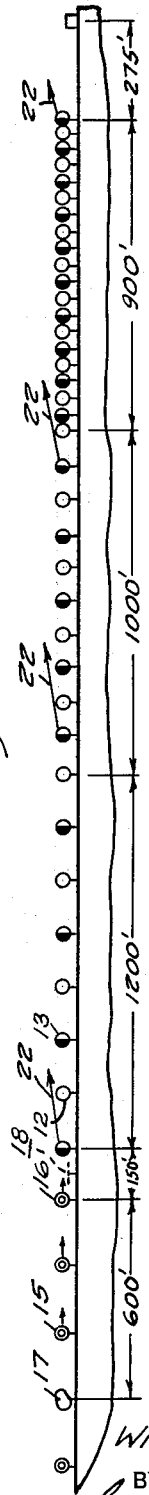
Fig. 2 is a similar view in elevation also showing the location of the light units of Fig. 1.

Referring to the drawings and to Figs. 1 and 2 in particular, there is shown in diagrammatic form the arrangement of the various light units embodied in the system. In Fig. 1, the landing or approach end 10 of the runway 11 is shown, and the line of flash and blaze light units 12 and 13, respectively, extending outwardly therefrom in parallel spaced relation to the extended center line 14 of the runway for a distance of about 3,000 feet. The line extends to within a short distance, on the order of 275 feet, of the middle radio marker.

The runway 11 is outlined by a line of high intensity runway lights 15 spaced about 200 feet apart along each edge and preferably about 10 feet out from the runway paving. The end of the paving is marked by a line of these lights, which may be termed threshold lights 16, arranged with an 80-foot spacing gap at the center of the runway.

These runway and threshold lights 15 and 16 may be of the type disclosed in my copending application, Serial No. 751,026, filed May 28, 1947, issued February 19, 1952, as Patent No. 2,586,374, to the same assignee as this invention. These lights are of the high intensity type operable to produce candle powers up to 100,000. These lights utilize three lamps and may be operated as high intensity or low intensity units. For high intensity operation, while two sealed beam lamps directed in opposite directions up and down the runway are available for use, only one of these lamps is used at a time. It may be operated at 100,000; 30,000; 10,000; 3,000 or 1,000 candle power. For low intensity operation, a single low-intensity lamp in a bidirectional optical system is utilized and operated to produce 500; 150; 50; 15 or 5 candle power. The ten steps of brightness of these lights match the ten steps of brightness which is available in the approach line as will be described hereinafter. As shown in Figs. 1 and 2, the light produced by these units is directed or restricted to the direction of approach as indicated by the arrows.

When weather conditions are such that the low intensity lamp only is used, the emitted light is bidirectional. There is also some light around the unit. In thick weather when high candle powers are necessary, the high tensity sealed beam lamp is used and all the light emitted thereby severely restricted to the direction of approach. The purpose of this arrangement is to prevent background lighting and lighted haze or fog curtains behind each unit that would reduce perception of the next light in the line.

In addition to these units, there is provided at each side of the runway an angle of approach indicator light 17 spaced about 600 feet from the end of the paving. This light may be of the type disclosed in the copending application of Willis A. Pennow and R. T. Burns, Serial No. 632,045, filed November 30, 1945, issued February 21, 1950, as Patent No. 2,498,294, which is operable to project a tri-colored beam of light toward the incoming plane which appears as a yellow caution light if the plane is too high, a red warning light if it is too low, and a green light if within safe landing limits. These lights are pulsed, that is, they are on for a second and off for one-half second to avoid confusion with the other lights of the system.

Between the end of the runway pavement and the inner end of the line of lights extending therefrom, there is located a runway designator 18 of known construction. This device is made up of an assembly of luminous tubes so formed that when operated, a large red cross 19 or a large green arrow 21 is shown. While only one runway designator 18 is shown in Fig. 1, it is to be understood that another unit of similar character may be, and usually is, located at the opposite end of the runway paving. These devices give positive control of all air traffic during normal weather and function in connection with the system to provide a last moment safety signal to a landing airplane during restricted visibility conditions. The green arrow is assurance to the pilot that the runway is clear and that he is at proper position to make a landing.

As stated hereinbefore, all of the light units 12 and 13 are aimed at the center of the approach zone at a point about 6,000 feet from the threshold of the runway and at about 1,000 feet elevation as indicated by the arrows 22 in Fig. 2. The beam spread of each unit is such as to cover the normal approach portal which is an imaginary frame about 400 feet high and 700 feet wide with its edge about 100 feet above the level of the runway, about 3500 feet from the threshold.

FLASH UNITS—GENERAL DESCRIPTION

Figure 4:
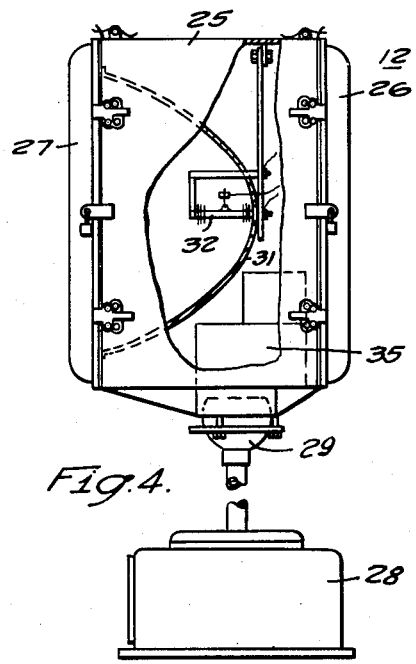
Fig. 4 is a side elevational view, partly broken away, to show details of the light unit of Fig. 3.

Referring now to Figs. 3 and 4, showing one of the plurality of flash units 12, it will be observed that this unit comprises a housing 25 having a hinged backdoor 26 and a hinged transparent cover 27. The housing 25 is pivotally mounted upon a base member 28 by means of an adjustable ball and socket mounting 29 so as to provide for aiming the unit in any desired direction.

Within the housing 25 and back of the front cover 27, there is mounted a reflector 31 within which is mounted a high intensity electric discharge lamp 32. In this instance, this lamp is in the form of a krypton lamp which is operated as a flash lamp only at a calculated brightness of about 1,000,000 candle power on low operation or about 3,300,000,000 candle power on high operation.

In order to operate this type of lamp in this manner, it is necessary to provide a power supply unit for converting normal electric power of relatively low voltage at a standard frequency to direct-current power of high voltage. In this instance, this is accomplished by means of a power supply unit 35 which is also mounted within the housing 25. The details of this power supply unit will be described hereinafter in connection with the over-all system. It is sufficient to state here that each flash unit is provided with its own power supply unit 35 and all of the power supply units are individually controlled to effect the desired flashing operation of the flash units.

BLAZE UNITS—GENERAL DESCRIPTION

Figure 6:
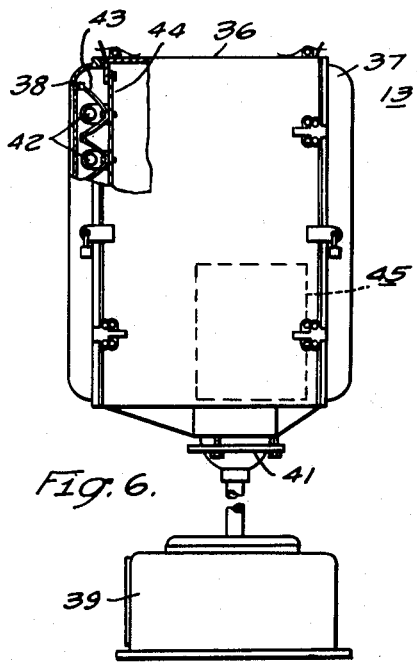
Fig. 6 is a side elevational view partly broken away to show details of the light unit of Fig. 5.

Referring to Figs. 5 and 6, there is shown one of the plurality of blaze units 13 of the system. This unit is referred to as a blaze unit even though it is sometimes operated as a flash unit. It likewise is comprised of a housing 36 having a hinged backdoor 37 and a hinged transparent front cover 38, and has the same general appearance as the flash unit 12.

The housing 36 is pivotally mounted on a base 39 by means of an adjustable ball and socket joint 41 to provide for aiming the unit in the same manner as the flash unit.

This unit differs from the flash unit 12 in that it utilizes a plurality of tubular neon lamps 42 which are mounted in parallel relation in individual reflectors 43 as shown in Fig. 6. These reflectors are supported by a common back plate or base 44 which is detachably mounted within the housing directly back of the front cover 38.

This unit, as in the case of the flash unit 12, requires the use of a power supply unit 45 which is also mounted within the housing 36. Details of this unit will be described hereinafter, but it is to be understood that it functions in the same general manner as the power supply unit 35 to effect a flashing operation of the lamps 42 at different intensities, and also to effect a steady burning operation thereof at different intensities.

On flashing service these lamps are operated at about 100,000 or 10,000,000 candle power as desired. On steady burning operation, they produce either 100, 1,000 or 10,000 candle power as desired.

The particular lamps 42 that are used in these blaze units are similar to the well-known neon tube, except that special electrodes are utilized and the lamps are gas-filled to permit operation at different brightness levels.

CONTROL SYSTEM IN GENERAL

(a) Power supply and distribution

Referring now to Figs. 7, 8 and 9 which fit together in end-to-end relation as indicated in the connecting conductors, there is shown in diagrammatic form the control system for the flash and blaze units 12 and 13, respectively, together with their power supply system. Only one of each of these units is shown in detail but it is to be understood that a plurality of each are utilized in the system. In this particular example, a total of thirty-six of each is contemplated.

As shown in Fig. 7, electrical power for operating the light units is supplied by a suitable power source, indicated by conductors 50 and 51, through a main power transformer 52 having a primary winding 53 connected to the source through a suitable main circuit breaker (not shown) which may be controlled and otherwise operated in any suitable and well-known manner.

The main power transformer 52 is provided with secondary windings 54 and 55 which supply two power distribution circuits, one for the blaze units 13 and the other for the flash units 12. These circuits are comprised of two main conductors and a neutral conductor, thus the blaze circuit is comprised of main conductors 56 and 58, and a neutral conductor 57. The flash circuit is comprised of main conductors 61 and 62, and a neutral conductor 63.

In addition to the secondary windings 54 and 55, the main power transformer is also provided with an auxiliary secondary winding 64 for a control power source. As shown, one terminal of this winding is connected to a main control conductor B, while the other terminal is connected to a ground conductor G which is common to both of the neutral conductors 57 and 63 of the distribution circuits and extends throughout the system.

While only one main power transformer and two distribution circuits have been shown for the sake of simplicity, it is to be understood that additional distribution circuits may be provided and separate power transformers may be utilized for each distribution circuit as well as a separate transformer for the control circuits.

(b) Control relays, etc.

In Fig. 7, there is also shown the selector switches and relays for selectively controlling the operation of the blaze and flash units and their associated power supply units. The numeral 65 designates, generally, the flash selector switch which is common to all of the flash units 12. The numeral 66 designates, generally, the blaze selector switch common to all of the blaze units 13.

The flash selector switch 65 is operable from an "off" position through positions Nos. 1 to 5, of which position No. 2 is the "low intensity" setting and the position No. 5 the "high intensity" setting of the flash units.

The blaze selector switch 66 is operable from an "off" position in opposite directions. In one direction, which may be termed the "blaze flash" direction, it is operable through positions Nos. 1 through 5 of which No. 2 is the "low intensity" position and No. 5 is the "high intensity" position. In the opposite direction, it is operable through positions Nos. 1 through 4 which is the blaze or steady operating direction. Position No. 2 is the "low intensity" position, No. 3 the "medium intensity" position, and No. 4 the "high intensity" position.

It is to be understood that when the flash selector switch 65 is operated to the "low intensity" position 2, the flash units 12 are all operated in a manner as will be described hereinafter at low intensity; and when in the "high intensity" position 5, these units are operated at their highest or maximum intensity. The same is true as regards the blaze units 13 in response to the operation of the blaze selector switch 66, except that in this instance these units are also operated as steady burning units of different intensities.

(c) Control for flash units

Associated with the flash selector switch 65, there is a flash preheat switch FP, a flash indicating lamp FIL and a plurality of control relays FTD, FO, FH, FL and FI, which may be termed the flash control relays and which function, generally, to control the operation of the power supply units 35 of the flash units 12 in response to the operation of the selector switch 65 and other elements of the system as will be described more in detail hereinafter.

The flash indicating lamp FIL is controlled by a pair of flash indicating relays FI1 and FI2 and a calibrating relay LFI. As shown, the relays FI1 and FI2 are connected to be responsive to the voltage drop across line resistors LRa, LRb and LRc, LRd, respectively, and the position of the LFI relay determines whether only one or both of the resistors of each pair are effective.

It is to be understood that in this instance all of the flash units 12 are, or may be, connected to the distribution circuit and operated at two different intensities with each intensity operation drawing a different amount of total load current. In order to give an indication as to whether or not a major portion of the flash units are in operation so as to make the line effective, the flash indicating relays FI1 and FI2 are so controlled as to be responsive to the different amounts of current being drawn by the light units. When these relays are both closed, the indicating lamp FIL is lighted. Whether or not these relays are closed depends upon the voltage drop in the line resistors LRa, etc., to which they are connected.

Since different amounts of currents are drawn by the units when operated at different intensities, it is necessary to vary the respective values of the line resistance to which the FI1 and FI2 relays are responsive. This is the functtiton of the calibrating relay LFI which is so controlled in accordance with the position of the flash selector switch 65 as to vary the line resistance in accordance with the high or low operating position thereof.

On low intensity operation of the flash units, the current is at its minimum and only the resistors LRa and LRc are effective. The voltage drop is sufficient to operate the relays FI1 and FI2 so as to close the circuit to the indicating lamp FIL when a predetermined number of the units are in operating condition and are drawing current.

When the units are operated at high intensity, a greater amount of current is drawn, and the resistors LRb and LRd rendered effective by the closure of calibrating relay LF1 so that the flow of this increased load current will give about the same voltage drop for operating the relays FI1 and FI2. In other words, the line resistors LRa, etc., are calibrated in accordance with the position of the selector switch 65 through the operation of relay LFI. Any other suitable arrangement may be used for obtaining an indication on both intensities, or on only one.

(d) Synchronizer or timer

Referring now to Fig. 8, there is shown in the upper left-hand corner a motor-operated synchronizer or timer T for controlling the flashing operation of all the blaze and flash units. The timer T comprises, generally, a plurality of adjustable cam-operated switches 70–1, 70–2, 70–3, 70–4, etc., up to 70–72 in this example, actuated by a motor 71 through a reduction gear 72. It is to be understood that there is a switch individual to each light unit that is to be flashed. In this instance, only four switches are shown, but for the complete system of this example a total of 72 switches are required.

The function of the timer T is to effect a flashing operation of the flash and blaze units either as individual groups or collectively as one group in a predetermined sequence and in predetermined timed relation. In other words, the timer functions to positively initiate or control the flash operation of each unit. As will be described more in detail hereinafter in connection with the operation of the system, the lamps of the flash units, as well as those of the blaze units when they are operated as flash units, are subjected to an operating voltage by their associated power supply units and are initiated into operation, or ignited, by subjecting them to an ignition voltage. The application of this ignition voltage to the lamp or lamps of each unit is directly and precisely controlled by the timer T.

Each of the switch elements 70–1, etc. of the timer may be comprised of a cam 73 adjustably mounted on the drive shaft 74, a movable arm 75 carrying contact members 76 pivotally mounted on an adjustable support 77 at one end with its free end biased against the cam by a spring 78. It will be understood that since the cam 73 is adjustable on the shaft 74 and the position of the arm 75 is also adjustable, the switch element may be adjusted or set to a high degree of accuracy so that all of the sets of contact members may be caused to so function that the blaze and flash units will be operated in the desired sequence and in the exact desired timed relation.

(e) Power supply units—Flash units

Referring to the upper right-hand corner of Fig. 8, there is shown the flash lamp 32 of one of the flash units 12 and the electrical elements of its associated power supply unit 35. These lamps are operated as flashing lamps only by energy discharged from a pair of condensers or condenser banks CF1 and CF2. The main electrodes 80 and 81 of the lamp are connected across one or both of the condensers which are alternately charged and discharged through the lamp when its ignition electrode 79 is energized in response to the operation of the timer T.

In addition to the condenser banks, the power supply unit comprises a plurality of control relays 82, 83 and 84, a filament transformer TF2, a power transformer TF1, a pair of rectifier tubes 85 and 86, a pair of resistors RF1 and RF2, and a pair of potentiometers 87 and 88. The electrical energy for operating the flash lamp as well as the control relays of the power supply unit is obtained from the distribution circuit represented by conductors 61, 62 and 63. The filament transformer TF2 has its secondary winding 89 connected to the filaments of the rectifier tubes in a well-known manner. The secondary winding 90 of the power transformer TF1 is connected to the plates of the tubes. The charging circuit for the condensers extends from the middle tap 91 on the secondary winding 90, through conductor 92, condenser CF1, conductors 93 and 94, contact members 84a, conductor 95, potentiometer 87 and resistor RF2 in the middle tap of the secondary winding 89.

It will be noted in this instance that this is the charging circuit for both condensers in parallel which is effective when relay 84 is deenergized as shown. In this position, contact 84b connects condenser CF2 in parallel with CF1. Contact members 84a when closed, as shown, shunt the potentiometer 88 and resistor RF1 from the charging circuit. This provides for increasing the charging current for the maximum capacitor connection. It will be apparent that when relay 84 opens its contact members, condenser CF2 will be disconnected and the potentiometer 88 and resistor RF1 rendered effective so as to increase the resistance of the charging circuit for the lower capacitor connection. As will be described hereinafter, the single capacitor CF1 is used for low intensity flashing operation and both capacitors for high intensity flashing operation.

Relay 83 functions to control the effectiveness of the discharge resistor RF3 connected across the capacitors.

Relay 82 functions to render the ignition circuit controlled by the timer T effective. This circuit is closed by contact members 82a. This relay also functions to energize the primary winding 96 of the power transformer TF1 through its contact members 82b.

Reference has been made to the operation of the flash lamps 12 by energizing their ignition electrodes 79. In order to provide a high frequency, high-voltage ignition voltage which may be impressed on the ignition electrode in response to the operation of the timer, each power supply unit also embodies an ignition circuit in the form of a Tesla coil 100. Since this device is of known construction, it will not be described in detail except to state that the high-voltage secondary winding 101 is connected to the ignition electrode 79 and to ground as shown. The operation of the power supply unit 35 is such that lamp 32 is subjected to the proper operating voltage by the condensers and, when the ignition electrode 82 is energized, the lamp is caused to discharge and flash. It is necessary to energize the ignition electrode for each flash operation of the lamp.

(f) Control for blaze units

Associated with the blaze selector switch 66, there is a blaze preheat switch BP, a pair of indicating lamps BFIL and BSIL and a plurality of control relays BTD, BO, BFL, BFH, BI, BSL, BSM and BSH, which may be termed blaze control relays and which function, generally, to control the operation of the power supply units 45 of the blaze units 13 in response to the operation of the selector switch 66 and other elements of the system as will be described more in detail hereinafter.

The indicating lamps BFIL and BSIL which perform the same function as the lamp FIL associated with the flash units 12, are controlled by two pairs of indicating relays BF1, BF2 and BS1 and BS2, respectively, calibrating relays LBFI and MBSI, respectively, and line resistors LR1 through LR8.

As in the case of the flash units, the indicating relays BF1 and BF2, which are effective during the flashing operation, and BS1 and BS2, which are effective during the blaze or steady operation, are responsive to the voltage drop across the line resistors LR1 through LR8. Two indicating lamps, two sets of indicating relays and two sets of resistors are required in view of the fact that the blaze units 12 are operated in two different ways, that is, flash and blaze or steady.

The calibrating relays LBFI and MBSI are selectively controlled in accordance with the position of the blaze selector switch 66 to provide the necessary connections for the line resistors LR1 through LR8. This operation will be described more in detail hereinafter, but it is to be understood that this arrangement functions in the same general manner as described hereinbefore in connection with the flash units 12.

(g) Power supply units—Blaze units

Referring now to Fig. 9, there is shown the lamps 42 of a blaze unit 13 and the electrical elements of the power supply unit 45 for operating the lamps as blaze lamps to provide a steady light of different intensities, or as flash lamps to provide a flashing light of different intensities.

This power supply unit 45 functions in generally the same way as a power supply unit 35 described in connection with the flash unit 12 except that in this instance the lamps 42 are operated in two different ways, namely, flash and steady. Insofar as the flash operation is concerned, the elements and their manner of operation are generally the same.

As shown, the six lamps 42 are connected in series circuit relation and each lamp is provided with a cutout device 108 connected in parallel therewith to provide a shunt connection for the lamp in the event of failure thereof.

The unit comprises, generally, a pair of rectifier tubes 109 and 110, a plurality of control relays 111, 112, 113, 114, 116 and 117, a power transformer TB1, a filament transformer TB2, potentiometers 118 and 119, and resistors RB1, RB2, RB3 and RB4.

As in the case of flash power supply unit, the plates of the tubes 109 and 110 are connected to the secondary winding of TB1 and the filaments to secondary winding of TB2. The charging circuit for the condensers or condenser banks CB1 and CB2 extends from a middle tap 120 on a secondary winding of TB1 through contact members 116c, either condenser CB1 alone or in parallel with CB2 depending upon the position of the relays 116 and 117, and either through both potentiometers 118 and 119 and resistors RB1 and RB2 in series or potentiometer 119 and resistor RB1 alone depending upon the position of relay 117, to the middle tap 121 on the secondary winding of TB2.

As will be explained more in detail hereinafter, relay 116 is energized when the lamps 42, are being operated as flash lamps and closes the charging circuit at contact members 116c and condenser CB1 is effective. When relay 117 is deenergized, as shown, it connects the second condenser CB2 to the charging circuit in parallel with CB1 through contact members 117a, and at the same time calibrates the charging circuit. With contact members 117b closed and contact members 116g of relay 116 also closed, the potentiometer 118 and its associated resistor RB2 are shunted out of the charging circuit so as to decrease the resistance thereof. When relay 117 is energized, condenser CB2 is disconnected and the potentiometer 118 and resistor RB2 rendered effective to increase the resistance of the charging circuit on low intensity flash operation.

When the lamps 42 are operated as blaze or steady units, the condensers and their associated charging circuit are ineffective as relay 116 is deenergized. In this instance, the lamps are connected directly across the secondary winding of the power transformer TB1 through contact members 116a and 116f of the relay 116, which is the main control relay. When relay 116 is energized, this connection is interrupted and the lamps are connected across the capacitors through contact members 116b. The charging circuit for the capacitors is closed through contact members 116c as explained hereinbefore. Contact members 116d and 116e control the connection of the discharge resistors RB3 and RB4 to the condensers.

Relay 116 is also provided with other contact members 116h which close the ignition circuit or connection 123 to the lamps 42. As in the case of the flash unit, each blaze unit embodies an ignition circuit in the form of a Tesla coil 124 which has its high-voltage secondary winding 125 connected between ground and the ignition connection 123 through contact members 116h. This ignition connection goes to the midpoint of the series-connected lamps, as shown.

Instead of the Tesla coil 124, as shown in Fig. 9, a high-voltage high-reactance transformer 103 may be used, as shown in Fig. 10. In this instance, one terminal of the high-voltage secondary winding 104 may be connected directly to the reflectors 43 and the other terminal to ground. The low-voltage primary winding 105 is connected into the ignition circuit through contact members 111a of relay 111 in the same manner as the Tesla coil 124. Ignition of the lamps 42 is by induced capacitance between the lamps. The reflectors 43 are insulated from ground and from the lamps. The lamps are subjected to a direct-current potential by the capacitors CB1 and CB2 and form one plate of a capacitor. The reflectors 43 are subjected to an alternating-current potential from the ignition transformer and form the other plate of the capacitor. During each half cycle of the ignition transformer 103 the voltage difference between the direct-current plate and the alternating-current plate rises from zero to the sum of these voltages. The result is an induced voltage on the lamps so distributed that the gas in each is ionized for the full length of the lamps, regardless of individual differences in the lamps.

When relay 116 is deenergized as shown, and the lamps 42 are connected for blaze operation across the secondary winding 128 of the power transformer TB1, its primary winding 129 is selectively connected to the conductors 57 and 58 of the distribution circuit by the operation of relays 112, 113 and 114. The final connection to the distribution circuit is made through contact members 111b of relay 111. This is the main energizing relay for the power supply unit.

The contact members of the other control relays 112, 113 and 114 are so arranged and interconnected that, when relay 112 is energized and closed as it is throughout the blaze operation, relays 113 and 114 function to provide the necessary connections for the primary winding 129 to subject the lamps to the desired operating voltages. When relay 113 is closed, the primary winding 129 is connected across conductors 57 and 58 in series with the lower portion of reactor winding R, tap connection 131, and contact members 113b, 112a and 111b. This provides the necessary secondary voltage for operating the lamps on high blaze operation.

For the medium blaze operation, relay 113 is open and 114 closed. This connects the primary winding through the entire winding of reactor R and contact members 114b, 112a and 111b. This provides the intermediate secondary voltage for medium blaze operation.

For low blaze operation, relays 113 and 114 are both open and the primary winding 129 is connected directly to conductors 57 and 58 through resistor R7 and contact members 114a, 113a, 112a and 111b. This provides the necessary low secondary voltage.

This power supply unit also includes a third transformer TB3 and a condenser CB3. This condenser is rendered effective for power factor correction when both relays 112 and 113 are energized and closed. This occurs on high blaze operation.

OPERATION OF THE SYSTEM

(a) *Flash units*

In describing the operation of the entire system, it may be assumed that it is desired to operate only the flash units 12. Assuming that the main power transformer 52 has been energized so as to energize the control and distribution circuits and the flash preheat switch FP is closed, obvious energizing circuits are completed for relays FTD and FO. These circuits extend from ground conductor G to the other side of the control circuit B.

Relay FTD is a time delay relay and delays the closure of its contact members for a predetermined length of time so as to prevent operation of the power supply units until the filaments of the tubes have been properly heated. This is accomplished by preventing connection of the main control circuit conductor B to the secondary control conductor C, to which other control relays are connected, until after the predetermined time period.

Relay FO is the flash-on relay and when it closes its contact members a circuit is established for energizing the primary winding of the filament transformer TF2. This circuit extends from conductor G through contact members of the FO relay, conductor 132, primary winding of TF2 and conductor 133 to the distribution conductor 62. Conductor 132 also connects to power supply units of all the other flash units. Accordingly, all of these power supply units become energized for operation.

If a low flash operation is desired, the flash selector switch 65 is actuated to its No. 2 low position. On the No. 1 position, the FH relay is energized through an obvious circuit from ground conductor G, through contact members 134 and 135 of the selector switch which are bridged by the connected movable segments 136 and 137, conductor 138, coil of relay FH to main control conductor B. When the FH relay closes, it establishes an energizing circuit for relay 84 (Fig. 8) of the power supply unit which extends from conductor G, through its contact members 139, conductor 140, operating coil of relay 84 to distribution conductor 62. This effects the opening of relay 84 so as to disconnect condenser CF2 and increase the resistance of the charging circuit by rendering potentiometer 88 and its associated resistor RF1 effective, as described hereinbefore.

On position No. 2 of the selector switch, which is the low intensity flash position, relay FL is energized through segment 141 and conductor 142 to the secondary control conductor C which is now energized through the closure of relay FTD. The FI relay, which is the flash-ignition relay, is also energized at this same time through an obvious circuit. The function of this relay is to control the operation of the timer motor 71 and render all of the ignition circuits effective.

Upon the closure of relay FL, an energizing circuit for relays 82 and 83 of the power supply unit is established. This circuit extends from conductor G through contact members 143, conductor 144, and operating coils of these relays in parallel to distribution conductor 62.

Relay 82 closes to energize the power transformer TF1 through its contact members 82b and also closes the ignition circuit referred to hereinafter at contact members 82a.

Relay 83 operates to disconnect the discharge resistor RF3 from the condenser circuit at contact members 83a. It will thus be apparent that the power supply unit is now ready for operation on low flash.

When the FI relay closed, it established an operating circuit for the motor 71 of the timer T through its lower contact members a and conductor 146, and also closed the energizing circuit through all of the switches 70–1, etc., of the timer through its contact members b and conductor 148.

It will be understood that, so long as the selector switch remains on position No. 2, timer T will now function to flash the flash units 13 in the particular timed sequence as determined by the setting of the timer switches.

When relay FH closed, it established through its contact members 156 an energizing circuit for the calibrating relay LFI from conductor G to control conductor B. This relay opens its contact members a and b to disconnect line resistors LRb and LRd from the distribution conductors 61 and 62. The voltage drops across LRa and LRc are sufficient to operate relays FI1 and FI2 to close an obvious energizing circuit for the flash-indicating lamp FIL.

Assuming that it is desired to operate the flash units on high flash operation, the selector switch may be actuated through positions Nos. 3 and 4 to the high intensity position No. 5.

On position No. 3, all of the relays which have been energized on the low intensity flashing operation with the exception of relay 84 are deenergized. On position No. 4, relay 84 is also deenergized and condenser CF2 is then connected in parallel with CF1 so as to increase the available capacity, and the charging circuit is recalibrated by shunting the potentiometer 88 and resistor RF1. This provides for subjecting the lamp 32 to a higher operating discharge voltage.

On the high intensity position No. 5, the FL and FI relays are again energized through the segment 145 of the flash selector switch, and relay FH is deenergized. Upon the closure of relay FL, relays 82 and 83 are again energized to perform the same functions as before. Relay 82 closes the ignition circuit at contact members 82a and energizes the power transformer TF1 at contact members 82b. Relay 83 disconnects the discharge resistor RF3 at 83a. The FI relay again energizes the timer motor 71 through conductor 146 and closes the ignition circuit through conductor 148. So long as the selector switch remains on position 5, the flash units will be operated at their maximum or high intensity in accordance with the operation of the timer T.

Since relay FH is now open, the calibrating relay LFI is deenergized and line resistors LRb and LRd connected in parallel with LRa and LRc so that relays FI1 and FI2 function properly to operate to flash indicating relay FIL at the higher value of load current.

(b) *Blaze units—Flash operation*

Assuming now that it is desired to operate the blaze units as flashing units either alone or with the flash units 12, the operation is generally the same as for the flash unit but is somewhat more involved. When the blaze preheat switch BP is closed, the blaze time delay relay BTD and the blaze on relay BO are both energized and picked up through obvious energizing circuits extending between conductors B and G. The function of relay BTD is to prevent operation of the power supply units 45 until their filament transformers have heated the rectifier tubes to the proper temperature. When this occurs, the main control conductor B is connected to the secondary control conductor and other relays are rendered effective.

Upon closure of the BO relay, the filament transformer TB2 is energized from conductor G through contact members 157 and conductor 147 to distribution conductor 58.

This is the condition of the circuit with the blaze selector switch 66 in the "off" position. It will be apparent that when the selector switch is in this position, relay BFL is energized over a circuit which extends from conductor G through stationary contact members 153 and 155 bridged by the connected segments 150 and 151 and conductor 152 to the main control conductor B. When this relay is closed, it disconnects, at contact members a, ground conductor G from the coil of the blaze ignition relay BI. It establishes an operating circuit for relay 112 (Fig. 9) of the power supply unit which extends through its contact members b and conductor 154 and the coil of relay 112 to distribution conductor 58. Its contact members c are closed to connect B to E.

When relay 112 is closed, it performs a number of functions. At contact members 112b, it opens the power connection to the tap 130 of transformer TB1. It closes its contact members 112a to connect the entire primary winding 129 of TB1 to the power source. At contact members 112c, it partially closes the circuit to TB3.

On flash position No. 1 of the selector switch, the operating circuit for BFL relay is interrupted and it opens to deenergize conductor 154 and drop-out relay 112. When relay 112 opens, it energizes the main control relay 116 which functions to set up the necessary connections to the lamps for flash operation. In other words, this relay at contacts 116b and 116c establishes the charging circuit for the condensers and connects the lamps across the condensers. Contact members 116a and 116f are opened so as to disconnect the lamps from the full secondary winding of the transformer TB1 which is the blaze or steady connection. Contact members 116e open to disconnect the condenser discharge resistors RB3 and RB4. Contact members 116g are also closed. This relay stays closed during the entire flashing operation.

On position No. 1, the BFH relay is energized through stationary contact member 158, segment 159 and conductor 160. Upon the closure of this relay, it connects conductor G through its contact members a and conductor 161 to the operating coil of relay 117. This relay opens to disconnect condenser CB2 at contact members 117a and increase the resistance of the charging circuit by opening contact members 117b to render potentiometer 118 and resistance RB2 effective.

The BFH relay at its contact members b also partially establishes an energizing circuit from conductor G through conductor 162 and contact members a of relay BFL for the operating coil of the LBFI indicating relay (Fig. 8). This circuit, however, is open at contact members a of relay BSL and the indicating relay LBFI will not be operated until the selector switch is actuated to position No. 2, at which time relay BSL will be closed.

On position No. 1, the energizing circuit for the indicating lamp BFIL is also partially closed or set up through stationary contact member 163, segment 164, and conductor 165 to the lamp. This circuit extends on through the lamp BFIL, conductor 166 and contact members of relays BF1 and BF2 in series to the main control conductor B. The circuits are now ready for the low intensity flash operation.

When the selector switch 66 is actuated to the low flash position No. 2, the BSL relay is energized through stationary contact element 167, segment 168 and conductor 169. The coil of this relay is connected to the secondary control conductor E which is a continuation of the control conductor B energized or closed in response to the operation of the BTD relay. When the BSL relay closes, it energizes the BI relay, which is the blaze ignition relay, through its contact members a and closed contact members a of the BFL relay.

The BI relay closes and establishes an operating circuit for the timer motor 71 through its contact members a and conductor 146 as before. Contact members b also close to energize through conductor 172 all of the switches 70–2, 70–4, etc., of the timer T which control the blaze units. This is the same operation that was performed by the FI relay in connection with the flash units except that in this instance the energizing circuit to the control switches associated with the blaze unit is closed instead of that to the switches associated with the flash units.

The closure of the BSL relay also effects the operation of relay 111 of the power supply unit. The operating circuit for this relay is established from conductor G, through contact members b of the BSL relay, conductor 173 and the coil of relay 111, to conductor 58.

Upon the operation of relay 111, the ignition circuit is closed at contact members 111a and at contact members 111b the energizing circuit for the power transformer TB1 is completed. The circuit extends from distribution conductor 58, through contact members 111b, 112b, tap 130, to conductor 57. The power unit is now energized.

The timer T is operating and the blaze units are all being flashed at low intensity and their operation indicated by the BFIL lamp.

The closure of contact members a of relay BSL completes the operating circuit for the calibrating relay LBFI which opens its contact members to disconnect line resistors LR2 and LR4. The indicating relays BF1 and BF2 are now responsive to the voltage drops across line resistors LR1 and LR3 and function to complete the previously setup circuit for the indicating lamp BFIL in response to the line currents drawn by the blaze units.

If it is desired to flash the blaze units at high intensity, the selector switch 66 may be operated through positions Nos. 3 and 4 to the high intensity position No. 5.

On position No. 3, the BSL relay is deenergized but the BFH relay is still held energized. The circuit through the BFIL lamp is still set up.

When the selector switch is operated at position No. 4, the BFH relay is also deenergized which causes relay 117 to become deenergized and connect capacitor CB2 into the circuit and also decrease the resistance of the charging circuit by shunting potentiometer 118 and resistance RB2 at contact members 117a. This is to condition the power supply unit for high intensity flashing.

On position No. 5, the BSL relay is again picked up and performs the same operations as before. That is, it energizes the BI relay and relay 111 of the power supply unit. When the BI relay closes, it again initiates the operation of the timer T and closes the energizing circuit to the timer switches 70–2, etc., through conductor 172. Relay 111 functions as before to close the ignition circuit at contacts 111a and connect transformer TB1 to the power source through contact members 111b. The system is now operating to flash the blaze units at high or maximum intensity.

During this operation, the LBFI relay (Fig. 8) is deenergized as contact members b of relay BFH are open and resistors LR2 and LR4 are rendered effective. This calibrates the line resistance to the proper value to operate the indicating relays BF1 and BF2 to cause the indicating lamp BFIL to properly indicate the high intensity flashing operation. It is to be understood that, if desired, indication of the high intensity operation only may be provided.

STEADY OPERATION OF BLAZE UNITS

Assuming now that it is desired to operate the blaze units 13 to produce a steady light which may be referred to as a blaze operation. When the selector switch 66 is returned to the off position, the BFL relay is again energized through the contact segment 151, and relay 112 of the power supply unit is again energized through contact members b and closed. The BFL relay also connects the main control conductor B to the auxiliary conductor E through contact members c, and at contact members a opens the connection of ground conductor G to the BI relay. The BFL relay remains energized throughout the blaze operation.

When relay 112 (Fig. 9) closes, it deenergizes the main control relay 116 which, at its normally closed contact members 116a and 116f, connects the lamps 42 to the secondary winding of the power transformer TB1 for blaze operation. In other words, the lamps are connected directly across the full secondary winding of the transformer. Other contact members 116b, 116c and 116g of relay 116 disconnect the lamps from the condensers and charging circuit. It is to be noted that relay 116 remains deenergized throughout the blaze operation so as to maintain these connections.

On position No. 1 in the blaze steady direction of operation of the selector switch 66, the BFH relay is again energized through stationary contact members 158 and segment 170. The closure of contact members a of this relay again energizes relay 117 (Fig. 9) through conductor 161 which opens to disconnect condenser CB2 and the charging circuit. Contact members b of relay BFH also connect conductor G through a conductor 162 to partially close an operating circuit to the LBFI relay, this circuit is open at the normally closed contact members *a* of the BFL relay which are open, and is not effective.

On position No. 2, which is the low intensity steady position, the BSL relay is energized through segment 174 and stationary contact member 167. The closure of contact members *b* of this relay again energizes relay 111 of the power supply unit through conductor 173. Relay 111 remains energized throughout the blaze operation. Relay 111 at contact members 111*b* connects the primary winding 129 of TB1 to the distribution circuit. In this instance, since relay 112 is closed and relays 113 and 114 open, this primary winding is connected to conductors 57 and 58 through contact members 111*b*, 112*a*, 113*a* and 114*a*, and resistor R7. This provides the necessary secondary operating voltage for low intensity blaze operation.

On this operating position No. 2, the selector switch also establishes a circuit for the indicating lamp BSIL through stationary contact member 175, segment 176, conductor 177, lamp BSIL, conductor 178 and the contact members of the relays BS1 and BS2 (Fig. 8). Since the calibrating MBS1 relay is not energized at this time, line resistors LR6 and LR8 are connected. This, however, will not result in the operation of the indicating lamp BSIL as the low resistance is such that the voltage drop is not sufficient to operate the BS1 and BS2 relays. Therefore, no indication is obtained of the low intensity operation.

When the selector switch 66 is moved to position No. 3, which is the medium intensity blaze position, all of the relays which were operated remain closed and, in addition, BSM relay is energized through stationary contact member 179, segment 180 and conductor 181. At contact members *a* of this relay, a circuit is established from conductor G through conductor 182 to operate relay 114 of the power supply unit. When contact members 114*a* are opened and 114*b* closed, the primary winding 129 of TB1 is connected to the distribution conductors 57 and 58 through the full winding of reactor R. This provides the necessary secondary voltage for medium intensity blaze operation.

At contact members *b* of relay BSM an operating circuit is established for the calibrating relay MBSI extending through conductor 183. This relay opens its contact members to disconnect line resistors LR6 and LR8. The voltage drop across resistors LR5 and LR7 is now sufficient to operate relays BS1 and BS2 to close the partially completed circuit to the indicating lamp BSIL.

When the selector switch is operated to position No. 4, which is the high intensity blaze position, the same relays remain operated, except that the BSM relay is deenergized and the BSH relay is energized through stationary contact member 184, contact segment 185 and conductor 186. Upon the closure of contact members *a* of this relay, an operating circuit is established through conductor 187 for relay 113 of the power supply unit. When the BSM was deenergized, relay 114 was also dropped out. When relay 113 now closes, the primary winding 129 of TB1 is connected to the source through the tap connection 131 of reactor R. This establishes the correct secondary voltage for the high tensity blaze operation.

At the same time, relay 113 through its contact members 113*c* conpletes the energizing circuit for transformer TB3 which was partially closed through contact members 112C. This renders the condenser CB3 effective for power factor correction.

At this time the BSM relay is deenergized and the operating circuit for the calibrating relay MBSI is again opened at contact members *b*. This reconnects line resistors LR6 and LR8 so that the relays BS1 and BS2 again function to close the circuit to the indicating lamp BSIL to indicate the high intensity operation. Any other suitable or desired arrangement may be used.

While separate flashing operations of the flash and blaze units have been described, it will be apparent that these units may be operated in unison. That is, the timer T is so connected to the flash and blaze units alternately disposed along the line that they may be flashed one after the other so as to produce a simulated flash of lightning.

GENERAL DESCRIPTION—RESULTS

While the system may be used in any desired manner, it is believed that the flash units 12, which are of extremely high power, should be used for service during daytime weather conditions of ½ mile or less visibility, and night weather conditions of 500 feet or less visibility. These units operate at a calculated brightness of about 1,000,000 candle power on low intensity operation and 3,300,000,000 candle power on high intensity. The lamps of these units produce a maximum brilliance of 9,000,000 candle power per square inch which is magnified by the reflector and optical system to 3,300,000,000 candle power.

The blaze units 13 should be used continually on the line day and night, and operated as steady or blaze units during weather conditions ranging from clear to hazy daytime and from clear to light fog at night. In thick weather, they should be operated as flash units at different intensities. On steady operation, they produce either 100; 1,000 or 10,000 candle power. On flash operation, they produce either 100,000 or 10,000,000 candle power.

In view of the foregoing detailed description of a preferred embodiment of my invention, it will be apparent that I have provided a novel type of lighting system for facilitating the visual landing of aircraft under all weather conditions. The most important aspect of my invention is in the use of the line of lights which are so controlled and operated as to produce a simulated flash of lightning which travels toward the landing end of the runway, and which not only functions to give the pilot a sense of direction but also a sense of altitude and position. This is effected through the use of a combination of light units of such nature that they may be operated to produce the necessary kind and intensity of light to exactly suit the weather condition. The flash and blaze units are individually and positively controlled so as to effect a sequential timed operation thereof to produce the desired effect.

The effectiveness and reliability of the system is based upon the theory that the eye is a complex photo-sensitive device, using two elements, called the rods and cones, for complete vision. The rods perceive contrasts and motions appearing outside the line of direct vision, known as parafoveal vision, or side vision. The cones perceive everything in the line of direct vision, known as foveal vision. The visual acuity of the rods is about eight times that of the cones. Therefore, any motion, such as produced by a pattern, or line, of flashing lights as described hereinbefore, can be perceived much quicker than a fixed light, or pattern of fixed lights.

The eye has a definite time lag in correcting for different brightness levels. When the eye has adjusted itself to an existing brightness level, it is reluctant to recognize a change in the brightneess level. This time lag is quite appreciable in relation to the time necessary for photoresponse threshold, or the duration of light impressed on the eye necessary to see the light.

Thus we find, that with the duration of a light as one, the time lapse before direct vision will perceive the light in nominally eight, and recognition of brightness level change, or destruction of dark adaptability, is two hundred. As the actual time required for the eye to respond to a change in brightness level is from $\frac{1}{100}$ to $\frac{1}{200}$ of a second, depending on the individual, the duration of each individual flash from a light unit must not exceed one twenty thousandth (.00005) ($\frac{1}{200}$ of $\frac{1}{100}$) of a second, and the space, or time between the individual flashes in the pattern or line must be at least eight times the duration of the individual flash.

Thus the proper arrangement or timing of the flashes makes full use of the high intensity of the light sources or units without disturbing the brightness level adaptation of the eye that is accustomed to the illumination level of the surrounding media when the light sources are extinguished. As all seeing is by contrast, this maintenance of brightness level adaptation insures seeing the light at maximum contrast at all times.

The sequence of the flashes insures seeing the maximum possible length of the line, as the light unit nearest the observer or pilot is always the brightest and each successive flash leads the eye toward the next light unit in the pattern or line. Lights of lesser brightness are readily perceived by the eye that is led to them.

Thus the light units of the line in the system described are flashed in timed sequence from one end of the line to the other. Each light unit is individually controlled so that it is flashed at the proper time to produce successive simulated flashes of lightning always travelling in a predetermined path, i. e., toward the landing end of the runway.

The system of my invention has great flexibility insofar as the kind and intensity of lights are concerned. The approach line may be nothing more than a pale red line of 100 candle power units. As distinguished from this under the worst possible weather conditions, the line may have the appearance of a lightning stroke produced by 3,300,000,000 candle power units. All of the necessary kinds or combinations of light signals may be produced. It is believed that under zero weather conditions where there is a maximum day visibility of only 50 feet, the flash and blaze units of my system when operated at high intensity will have a minimum penetration of 1,000 feet. Thus it is apparent that, when the pilot of an incoming plane is guided by radio approach to the approach portal over the middle radio marker, the intensity of the light produced by the blaze and flash units will be such as to give him a reliable visual guide in completing the landing operation.

While a specific embodiment of my invention has been described, it is to be understood that the principles of my invention may be practiced in other ways. Accordingly, the particular embodiment described is to be considered as an example only.

I claim as my invention:

1. A landing approach light system for use at airports to facilitate landing operations under varying weather conditions comprising, a plurality of light units of at least two different types alternately disposed in line in the direction of a runway and extending outwardly from the end thereof, one type of unit each including a lamp which emits substantially white light, means for energizing said one type at different energy levels solely intermittently so that they are operable to produce a flashing beam of white light of different intensities, the other type of units including a lamp which emits a colored light, means for selectively energizing said other type either in an intermittent fashion or continuously at different energy levels so that they will produce either a flashing beam of colored light of different intensities or a steady beam of colored light of different intensities, said light units being aimed at a predetermined common area in the sky to define an approach portal, and control means operable at will for selectively energizing various combinations of said light units.

2. A landing approach light system for use at airports to facilitate visual landing of aircraft under varying weather conditions comprising, a line of light units extending outwardly from the landing end of the runway in the direction thereof, said light units being of two different types disposed alternately in the line, one type each including a lamp which emits substantially white light, means for energizing said one type at different energy levels solely intermittently so that they are operable as white flashing units at different intensities only, the other type of units including a lamp which emits a colored light, means for selectively energizing said other type either in an intermittent fashion or continuously at different energy levels so that they are operable as colored flashing or steady burning units of different intensities only, and control means operable to select either one or both groups of light units for operation and effect the desired operation of the selected units, thereby to provide for obtaining a variation in lighting ranging from a soft colored glow of minimum intensity to a bright flashing light of maximum intensity.

3. An approach light system for use at airports as an aid to effecting visual landing of aircraft under adverse weather conditions comprising, a plurality of light units disposed in spaced aligned relation outwardly from the landing end of the runway for a distance of approximately three quarters of a mile, and control means for effecting different intensities of candlepower output of said light units, the spacing of said units being graduated in groups from one end of the line to the other, said units being operable to produce directed light beams of varying intensity and all of said units being aimed at a predetermined area in the sky to define an approach portal beyond the outer end of the line, and circuit means including a timer switch mechanism operable to effect a sequential flashing operation of said light units from the outer to the inner end of the line in successive periods of predetermined duration, thereby to produce a simulated lightning flash.

4. In an approach lighting system having a plurality of light units for use at airports as an aid to the landing of aircraft under adverse weather conditions comprising, a plurality of light units utilizing high-intensity discharge lamps disposed in spaced relation in a line extending away from the landing end of the runway, said light units being operable to produce concentrated light beams of high intensity and said light units aimed at a predetermined area in the sky to define an approach portal, said units embodying individual power supply units including condensers which may be alternately charged from a low voltage power source and discharged through the lamps to subject the lamps to a relatively high operating voltage, said power units also including an ignition circuit connected to the lamps for selectively controlling the discharge thereof while being subjected to said relatively high operating voltage, circuit means including a main switch operable to connect all of the power supply units to a power source, a motor-operated timing switch having a plurality of switch elements individual to each light unit for controlling their respective ignition circuits, said timing switch being effective when operating to flash the light units in sequence, and circuit means including a control switch operable to effect closure of the main switch to connect the power supply units to the power source and initiate the operation of the motor-operated timing switch.

5. In an airport approach lighting system having a plurality of light units extending in a line in spaced relation away from the end of the runway, said light units being of the flashing type operable to produce a brilliant light flash of momentary duration, an energizing circuit for the light units, an electrically-operated switch for controlling said circuit, an energizing circuit for the switch, a motor-operated timer mechanism operable to effect a sequential operation of the light units in timed relation from the outer to the inner end of the line adjacent the landing end of the runway, an energizing circuit for the timer mechanism, circuit means for controlling the intensity of the light produced by the light units, and a selector switch operable to different positions to control said circuit means and the energizing circuits of the electrically operated switch and timer mechanism.

6. An approach light system for use in connection with a runway as an aid to the landing of aircraft under all weather conditions of from maximum to zero zero visibility comprising, a first group of light units each embodying a single light source in the form of a high intensity discharge lamp mounted in a dish-shaped reflector and operable only to produce a beam of flashing white light, a second group of light units each embodying a plurality of tubular discharge lamps mounted in individual trough-shaped reflectors operable to produce a beam of flashing or steady colored light of lower intensity than the beam produced by the first groups of units, said light units of the first and second groups being disposed alternately in a line extending away from the end of the runway and parallel to the extended center line thereof, the light beams from all of said units being directed upwardly at a point located a predetermined distance from the the end of the runway and above the level thereof, and circuit means including a timing mechanism common to all of said units operable through successive cycles of predetermined duration to effect a sequential flashing of all of the light units simulating a flash of lightning travelling toward the landing end of the runway.

7. An approach light system for use in connection with a runway as an aid to the landing of aircraft comprising, a plurality of light units extending in spaced relation outwardly from the end of the runway in parallel relation with an extended centerline of the runway, a predetermined group of said light units being of the flashing type embodying a single electric discharge lamp capable of producing light flashes of high intensity mounted within a reflector, and the remainder of said light units being of the blaze type embodying a plurality of tubular discharge lamps mounted within individual reflectors and operable to either produce a steady light or a flashing light of lower intensity and of a different color than the flashing units, said flashing units and blaze units being disposed alternately in the line, circuit means for energizing the light units including selector switch means operable to determine the intensity of the light produced by the units when operated, and a master timing controller operable through successive cycles to effect a sequential operation of the light units in predetermined timed relation, thereby to produce a light signal resembling a flash of lightning travelling toward the end of the runway.

8. An approach light system for use at air ports as a visual aid to landing aircraft under the most adverse weather conditions comprising, a plurality of high-intensity light units of the flashing type disposed in spaced relation in a line extending from the end of the runway parallel to the centerline thereof, each of said light units being operable to produce a concentrated light beam of different intensities and to permit the beams from all the units to be directed toward a predetermined spot or area in the sky at a predetermined distance from the end of the runway, circuit means including a selector switch operable to control the intensity of the projected light beams from all the units, and a timing mechanism responsive to the operation of the selector switch operable to effect the operation of the light units in sequence in predetermined timed relation from the outer to the inner end of the line, thereby to produce a simulated flash of lighting travelling downwardly from said area in the sky toward the landing end of the runway.

9. A lighting system comprising, a first group of light units embodying a high-intensity discharge lamp operable as a flash lamp only and a power supply unit, said power supply unit being selectively operable to subject the lamp to different operating voltages and embodying an igniter circuit for igniting or starting the lamp, a second group of light units embodying a plurality of low intensity discharge lamps operable as flash lamps or steady burning lamps and a power supply unit, said power supply unit being selectively operable to operate the lamps as steady burning lamps of different intensities or as flash lamps of different intensities and embodying an igniter circuit for flash operation, a motor-operated timer mechanism embodying a switch element connected to the igniter circuit of each power unit and operable to effect the energization of the igniter circuits in a predetermined sequence in successive operating cycles, an electrically operated switch operable to connect the power supply units to a power source, a first selector switch individual to the first group of light units operable to different positions corresponding to different light intensities, a second selector switch individual to the light units of the second group operable to different positions corresponding to flashing and steady burning operation of the lamps and at different intensities, and circuit means including a plurality of control relays operable in predetermined combinations and sequence in accordance with the operation of the selector switches to control the operation of the said electrically-operated switch, motor-operated timer and power supply units, thereby to provide for effecting individual and collective operation of the groups of light units.

10. A lighting system comprising, a plurality of light units each of which embodies a discharge lamp as a light source and a power supply unit adapted to be energized from an alternating current power source and selectively operable to subject the lamp to direct current voltages of different values, said power supply units also embodying an igniter circuit connected to its associated lamp operable to ignite the energized lamp, a selector switch operable to different positions corresponding to different light intensities, circuit means including a plurality of control relays controlled by the selector switch for connecting the power units to the power source and adjusting them to produce the desired operating voltage for their associated lamps, and a motor-operated timer mechanism responsive to the operation of certain of said control relays having switch elements individual to the ignition circuits of the power supply units operable to effect the ignition of the lamps in a predetermined sequence.

11. In combination, a plurality of light units disposed in spaced apart aligned relation, said light units being of two different kinds, one of which embodies a high-intensity discharge lamp and is operable only as a flashing light and the other of which embodies a plurality of discharge lamps of lower intensity operable either as a flashing or a steady light, a power supply unit associated with each light unit selectively operable to subject the lamp or lamps to different operating voltages and including an ignition circuit for the lamp or lamps, a motor operated timer operable to effect the sequential energization of the ignition circuits of the several power supply units, electrically-operated switch means operable to connect the power units to a power source, a first selector switch individual to the flash light units operable to different positions in accordance with the desired intensity of the lights, a second selector switch operable to different positions to determine whether its associated light units are to be operated as flash or steady burning units and in accordance with the desired intensity thereof, and circuit means including a plurality of control relays selectively responsive to the operation of the selector switches operable to control the operation of the electrically-operated switch means, the motor operated timer and the power supply units.

12. The method of providing visual landing directions to the pilot of an incoming plane regardless of weather conditions and degree of visibility comprising the steps of projecting steady or flashing light beams of different intensities and of different colors at a common area in the sky in the approach path to the end of the runway by means of a line of spaced light sources extending outwardly from the end and in the same direction as the runway, and projecting a plurality of light beams of different intensity and colors from predetermined points alongside and at the landing end of the runway in a generally horizontal direction toward the direction of landing.

13. An approach light system for landing aircraft by visual control under adverse weather conditions comprising, a plurality of light units disposed in line in predetermined spaced relation and extending outwardly from the landing end of the runway, said light units being operable to produce momentary flashes of light and each embodying a power supply unit connected to the light source of the light unit operable when energized to subject said light sources to operating voltages and individually controllable to cause their associated light sources to flash, and a timer mechanism embodying a plurality of individual switch elements connected to the power supply units for so controlling said power supply units as to effect individual flashing operations of the light sources, the switch elements of said timer mechanism being arranged to effect timed repeating sequential operation of said light units in a direction from the outer end of said line toward the runway when said mechanism is continuously operated, and said mechanism having an operating speed such that said sequence simulates a lightning flash traveling toward the end of the runway.

14. The method of landing aircraft by visual control which comprises the steps of projecting a plurality of light beams of two different alternately disposed colors from spaced points in a line extending outwardly from the landing end of the runway at a common area in the sky in the approach path to the runway, and flashing the light beams in sequence from the outer to the inner end of the line through a predetermined number of cycles per minute.

15. The method of landing aircraft by visual control which comprises the steps of projecting a plurality of light beams of at least two different colors from spaced points in a line extending from the landing end of the runway outwardly therefrom in the same direction as the runway and to a distance of at least 3000 feet at a common area in the sky still further removed from the landing end of the runway and at a predetermined elevation above the level thereof, and flashing all or only a portion of said light beams in timed sequence through successive spaced cycles with each cycle starting at the outer end of the line.

16. An approach light system for use in connection with a runway as an aid to the landing of aircraft, comprising a plurality of light units extending in a line in spaced relation away from the end of the runway, said light units being of the flashing type operable to produce a brilliant light flash of momentary duration, and circuit means including timing switch means operable to effect a cyclic operation of said light units in predetermined sequence, said predetermined sequence simulating a lightning flash traveling toward the end of the runway.

17. An approach light system for use in connection with a runway as an aid to the landing of aircraft, comprising a plurality of light units extending in a line in spaced relation away from the end of the runway, said light units being of the flashing type operable to produce a brilliant light flash of momentary duration, and circuit means connected with said light units including means operable to effect a cyclic operation of said light units in predetermined sequence, said predetermined sequence simulating a lightning flash traveling toward the end of the runway.

18. An approach light system for landing aircraft by visual control under adverse weather conditions comprising, a plurality of light units disposed in line in predetermined spaced relation and extending outwardly from the landing end of the runway, said light units being of a flashing type operable to produce a brilliant light flash of momentary duration, each light unit having a power unit operable to store sufficient energy to operate the light source of its light unit when the latter is subject to a triggering pulse, supply conductors connected to said power units, and additional circuit means connected with said light units operable to deliver a triggering pulse to said light units in repeating sequence from the outermost light in a direction toward the runway, said sequences simulating repetitive lightning flashes traveling toward the end of the runway.

19. An approach light system for landing aircraft by visual control under adverse weather conditions comprising, a plurality of light units disposed in line in predetermined spaced relation and extending outwardly from the landing end of the runway, said light units being of a flashing type operable to produce a brilliant light flash of momentary duration, each light unit having a power unit including at least one condenser operable to store sufficient energy to operate the light source of its light unit when the latter is subject to a triggering pulse, and rectifying means for charging said condenser from an alternating current source of supply, alternating current supply conductors connected to said power units, and additional circuit means connected with said light units operable to deliver a triggering pulse to said light units in repeating sequence from the outermost light in a direction toward the runway, said sequences simulating repetitive lightning flashes traveling toward the end of the runway.

20. An approach light system for landing aircraft by visual control under adverse weather conditions comprising, a plurality of light units disposed in line in predetermined spaced relation and extending outwardly from the landing end of the runway, said light units each including means for collecting light and transmitting it from the unit in the form of a beam, all of said light units being aimed at a common area in the sky in the approach path to the runway, and circuit means connected with said light units including means operable to effect a cyclic operation of said light units in predetermined sequence, said predetermined sequence simulating a lightning flash traveling toward the end of the runway.

References Cited in the file of this patent

UNITED STATES PATENTS

| Number | Name | Date |
| --- | --- | --- |
| 545,701 | Lattig | Sept. 3, 1895 |
| 1,195,239 | Laszlo | Aug. 22, 1916 |
| 1,658,975 | Pietro | Feb. 14, 1928 |
| 1,860,685 | Morris | May 31, 1932 |
| 1,912,928 | Werner | June 6, 1933 |
| 1,932,065 | Corey et al. | Oct. 24, 1933 |
| 1,938,538 | Henninger | Dec. 5, 1933 |
| 1,997,470 | Parrott | Apr. 9, 1935 |
| 1,998,429 | Andre et al. | Apr. 23, 1935 |
| 2,038,506 | Cadieux | Apr. 21, 1936 |
| 2,088,370 | Gingras | July 27, 1937 |
| 2,155,295 | Bartow | Apr. 18, 1939 |
| 2,337,614 | McDowell | Dec. 28, 1943 |
| 2,350,407 | McDowell | June 6, 1944 |
| 2,438,453 | Powell | Mar. 23, 1948 |
| 2,449,063 | Edgerton | Sept. 14, 1948 |

OTHER REFERENCES

Popular Mechanics, October 1941, p. 79.